(12) United States Patent
Desai et al.

(10) Patent No.: US 9,200,708 B2
(45) Date of Patent: Dec. 1, 2015

(54) PISTON RETENTION APPARATUS AND METHOD

(71) Applicant: Caterpillar Inc., Peoria, IL (US)

(72) Inventors: Dinesh Desai, Aurora, IL (US); Chris Buckley, Naperville, IL (US); Brian Sybrandy, Morris, IL (US)

(73) Assignee: Caterpillar Inc., Peoria, IL (US)

( * ) Notice: Subject to any disclaimer, the term of this patent is extended or adjusted under 35 U.S.C. 154(b) by 464 days.

(21) Appl. No.: 13/776,769

(22) Filed: Feb. 26, 2013

(65) Prior Publication Data

US 2013/0220114 A1 Aug. 29, 2013

Related U.S. Application Data

(60) Provisional application No. 61/604,710, filed on Feb. 29, 2012.

(51) Int. Cl.
*F16J 1/00* (2006.01)
*F16J 1/08* (2006.01)

(52) U.S. Cl.
CPC .. *F16J 1/005* (2013.01); *F16J 1/08* (2013.01); *Y10T 29/49256* (2015.01)

(58) Field of Classification Search
CPC .................................. F16J 1/12; F16J 10/00
USPC ............................................ 92/179, 187, 255
See application file for complete search history.

(56) References Cited

U.S. PATENT DOCUMENTS

| | | | | |
|---|---|---|---|---|
| 3,101,651 | A | * | 8/1963 | Strader ........................... 92/258 |
| 3,334,549 | A | * | 8/1967 | Sheldon ......................... 92/248 |
| 3,885,461 | A | * | 5/1975 | Crisp et al. .................... 92/255 |
| 3,953,213 | A | | 4/1976 | Gasper |
| 3,994,604 | A | * | 11/1976 | Visser ............................ 92/172 |
| 4,089,253 | A | * | 5/1978 | Visser ............................ 92/255 |
| 4,566,703 | A | | 1/1986 | Zitting |
| 5,904,440 | A | | 5/1999 | Sims |
| 6,386,088 | B1 | | 5/2002 | Yoshimoto et al. |
| 7,353,749 | B2 | | 4/2008 | Hamasagar |
| 7,513,191 | B2 | * | 4/2009 | Kim et al. ...................... 92/255 |
| 8,122,812 | B2 | * | 2/2012 | Herwig .......................... 92/255 |
| 2002/0079649 | A1 | | 6/2002 | Terpay et al. |
| 2002/0100363 | A1 | | 8/2002 | Vatterott et al. |
| 2006/0245962 | A1 | | 11/2006 | Hamasagar |

FOREIGN PATENT DOCUMENTS

| | | |
|---|---|---|
| KR | 100801245 | 1/2007 |
| KR | 100868799 | 6/2007 |
| KR | 20100094186 | 2/2009 |

* cited by examiner

*Primary Examiner* — Thomas E Lazo

(57) ABSTRACT

An apparatus and method for coupling a piston to a rod to form a cylinder assembly are provided. The piston has a tapped bore extending therethrough for coupling to a first threaded region of the rod. The rod end extends beyond the piston member and includes a second threaded region for coupling to a tapped bore of a retaining member. The piston member is coupled to the rod member at a low torque, e.g., up to about 1000 Nm. An external thread of each of the threaded segment of the piston bore and the first threaded region of the first portion of the rod member may be formed with a root radius of greater than 0.125 pitch or with MJ class thread. The retaining member may include setscrews offset from one another for frictional engagement with the rod end. The thread pitch between the rod and the piston may be coarser than between the rod and the retaining member. An interface and a seal region between the rod and the piston may be disposed closer to the rod end side of the piston member than the threaded coupling.

20 Claims, 3 Drawing Sheets

United States Patent 9,200,708 B2

PISTON RETENTION APPARATUS AND METHOD

RELATED APPLICATIONS

This application is based upon and claims the benefit of priority from U.S. Provisional Application No. 61/604,710 by Dinesh Desai et al., filed Feb. 29, 2012, the contents of which are expressly incorporated herein by reference.

TECHNICAL FIELD

The present disclosure relates generally to a piston and rod assembly and more particularly to an apparatus and method for coupling together a piston and a rod.

BACKGROUND

Hydraulic cylinder arrangements typically include a piston member coupled to a rod member to form a piston and rod assembly. Various coupling arrangements have been used in the past to couple a piston member to a rod member.

For example, in a standard piston and rod assembly, a rod member is provided having a threaded reduced-diameter end. A piston member is provided to be received over the rod member end and for slideable engagement with a non-threaded region adjacent to the rod member end. A piston nut can be threadably engaged with the rod member end to retain the piston member on the rod member.

In another example, a piston and rod assembly 5 is shown in FIG. 1. Here, the piston member 6 itself is threaded onto the rod end 7 using standard M-class threads having a root radius of about 0.125 pitch, or when the pitch is 3, a root radius of 0.375 mm. Further, to prevent relative rotation between the piston member and the rod member, a pair of offsetting sinuLOC™ setscrews are used through the body of the piston member to engage the rod end. Although the assembly in FIG. 1 performs satisfactory for lighter duties, such as low pressure, low duty cycle, and/or low life cycle applications, such as found in application requiring backhoe loaders, there remains a need for an assembly that can handle heavier duties.

Another piston and rod assembly is described in Korea Pat. App. Publ. No. KR 20100094186A. The publication discloses a piston and rod assembly including a rod having an externally threaded end mated to an internally threaded bore of a piston. To prevent loosening of the piston from the rod, a piston nut is also threadably engaged to the rod end and in contact with the piston. One or more setscrews are inserted through corresponding radial openings extending radially through the inner circumference of the piston nut to engage the rod end. For instance, two setscrews are disposed off center with respect to the center of the rod. Further, the position of the stepped interface between the piston and the rod closer to the head end than the rod end undesirably increases the risk for stress riser development at that interface and thus joint failure.

As described previously, prior piston and rod assemblies may rely substantially upon engagement between a slidably engaged rod and piston joint with a nut threaded to the rod end for coupling a piston member and a rod member together. However, for such configurations, high torque, such as, e.g., 13,000 to 20,000 Nm, is used to tighten the nut to the rod end and form the retention joint between the piston and rod assemblies. As a result of the high torque application, the threads are tension pre-loaded and typical only the first three threads between the nut and rod end withstand a majority of the load, leaving the remaining threads underutilized. Hence, application of axial loading from both rod end and head end directions in combination with pre-load provides a total greater stress range to the threads, leaving the threads highly susceptible to fatigue and loosening. To couple the nut to the rod end, the rod end is often machined to a reduced effective cross-sectional area, thereby leaving a smaller cross-sectional area to withstand the higher loads. Consequently, the rod end must be processed in a manner for higher strength (such as constructed of higher strength materials and/or heat treated), thereby increasing the overall costs of production and/or increasing the risk of stress risers. Further, the fatigue of the threaded joint joined by high torque is substantially reduced compared to lower torque applications. Therefore, reducing or eliminating such reliance may facilitate stronger or otherwise more practical or economical structural configurations than provided with prior coupling arrangements.

The embodiments described herein are directed at overcoming one or more of the disadvantages associated with prior piston and rod assemblies.

SUMMARY

In one example, a piston and rod assembly for use with an actuating device is provided. The assembly can include a piston member, a rod member, and a retaining member. The piston member can have a piston bore extending between a first end and a second end. The piston bore can be a threaded segment. The rod member can have a first threaded region to be threadably engaged with the threaded segment of the piston bore. An end region of the rod member may extend beyond the second end of the piston member. A second threaded region may be provided along the end region. The retaining member can have a retaining bore extending therein. The retaining bore can have a threaded portion to be threadably engaged with the second threaded region of the rod member. The threaded segment and the first threaded region can be formed with a root radius of greater than 0.125 Pitch(P) at the root of the external thread, a root radius in the range of about 0.18042 P to about 0.15011 P at the root of the external thread, or alternatively in accordance with a MJ class thread.

In another example, the piston member may be coupled to the rod member at a low torque of less than or equal to about 1000 Nm. The piston bore may include an inner seat and the rod member may include an outer shoulder. The inner seat and the outer shoulder can engage with one another to form an interface. The piston bore may include an inner seal groove disposed adjacent the inner seat to include a seal member. The interface and the inner seal groove can be disposed closer to the first end or the rod end side of the piston member than the threaded segment. In another example, the retaining member may include a pair of setscrew bores and corresponding setscrews threadably engaged therein in an offset relationship from one another relative to a transverse axis. The tips of the setscrews may engage a recessed landing in the rod member end region.

In one example, a method of coupling a piston member having a piston bore with a rod member is provided. The method may include one or more of the following steps. A step may include threadably engaging a first portion of the rod member with the piston bore at a predetermined torque until an inner seat of the piston bore and an outer shoulder of the rod member engage with one another. An external thread of each of a threaded segment of the piston bore and a first threaded region of the first portion of the rod member has a pitch and is formed with a root radius of greater than 0.125 pitch. The torque may be any torque up to about 1000 Nm. Another step may include threadably engaging a second portion of the rod member into a retaining bore of a retaining member. Another step may include threadably engaging at least one setscrew through a corresponding setscrew bore formed in the retaining member so that a tip of the setscrew engages the rod member.

Although the drawings depict exemplary embodiments or features of the present disclosure, the drawings are not necessarily to scale, and certain features may be exaggerated in order to better illustrate and explain the present disclosure. The exemplifications set out herein illustrate exemplary embodiments or features of the disclosure and such exemplifications are not to be construed as limiting the scope of the invention in any manner.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
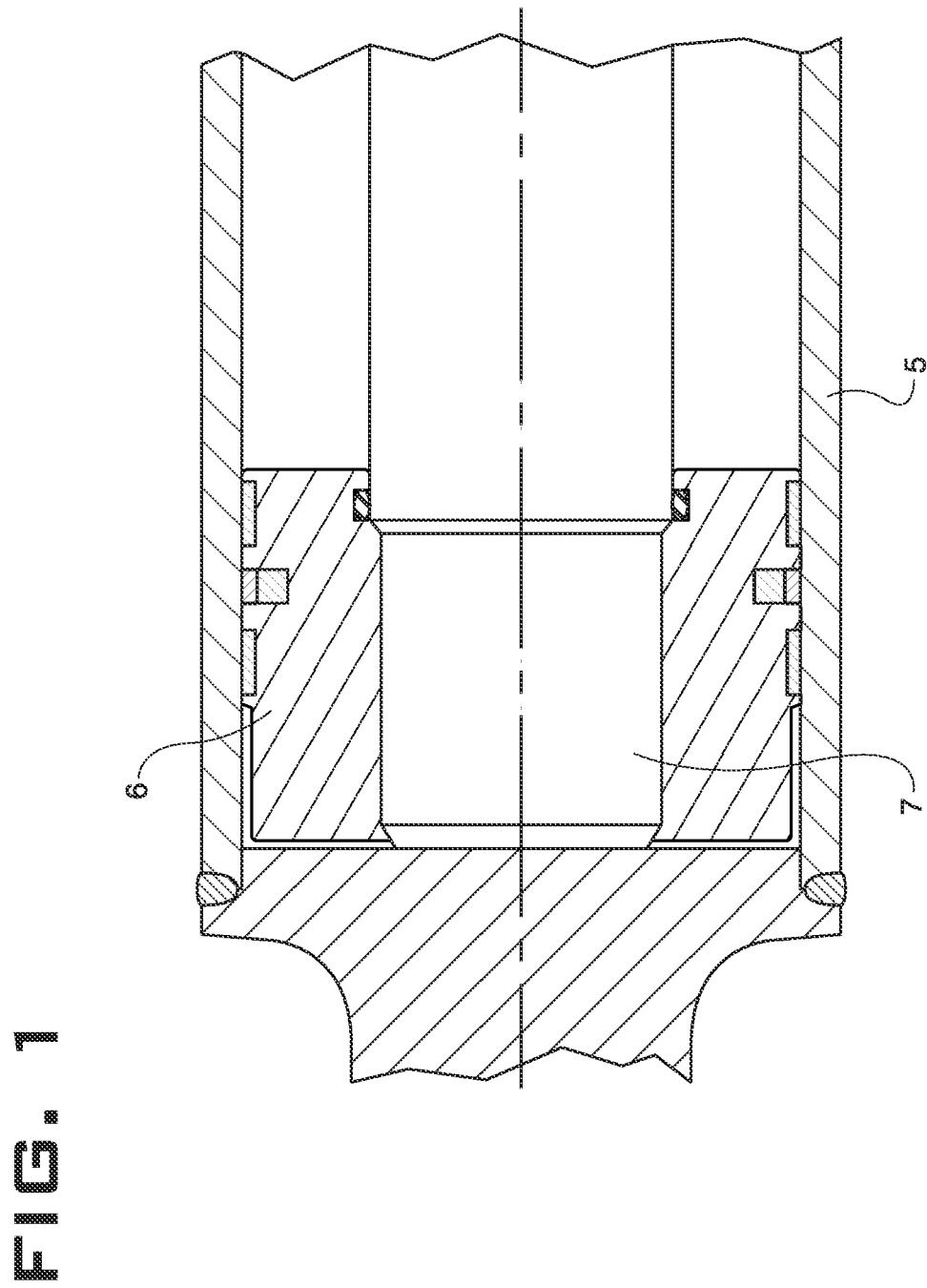
FIG. 1 depicts a piston and rod assembly.
Figure 2:
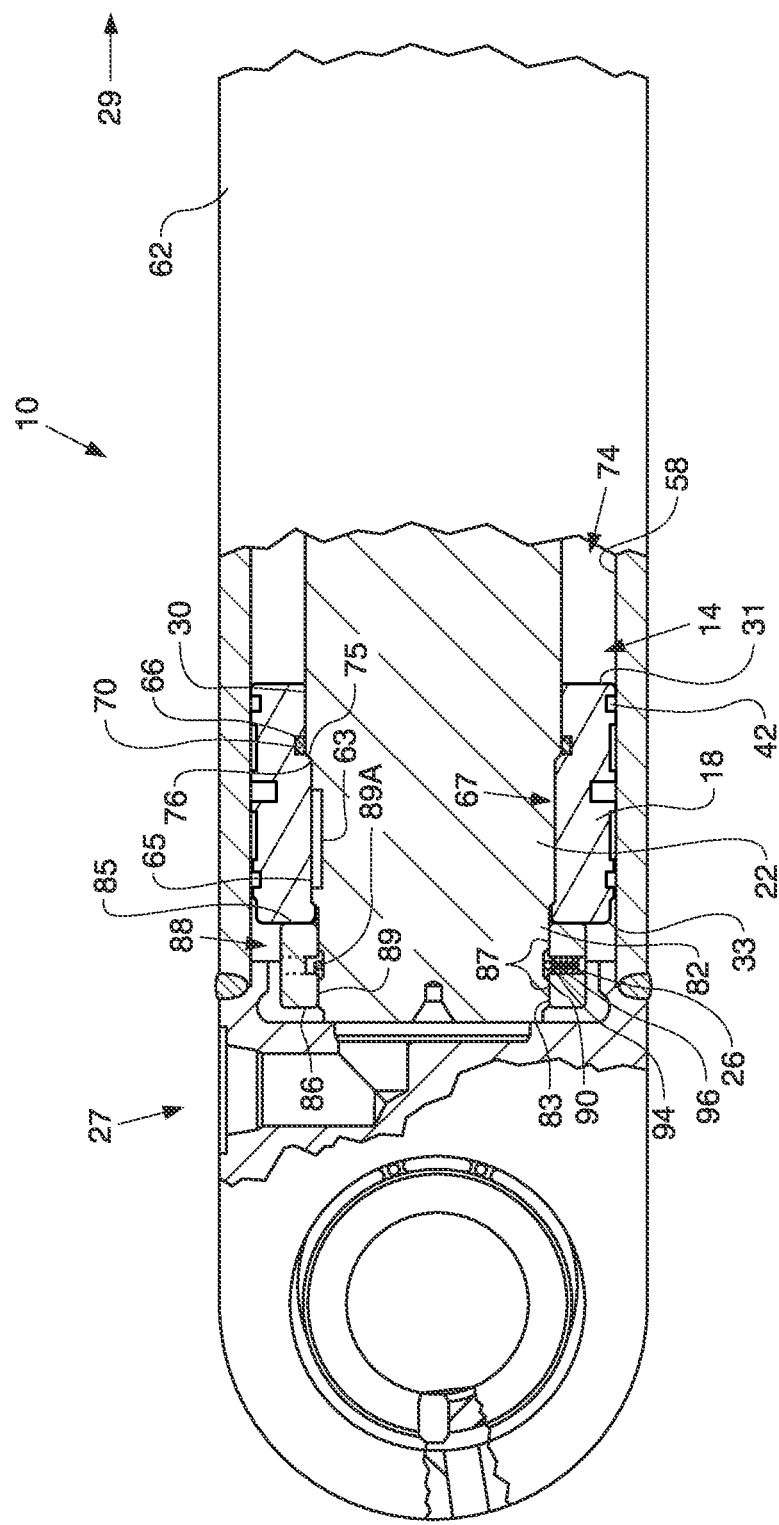
FIG. 2 illustrates a cylinder assembly having a piston and rod assembly.

Referring to FIG. 2, a cylinder assembly 10 may include a piston and rod assembly 14. The piston and rod assembly 14 may include a piston member 18, a preferably cylindrical rod member 22, and a retaining member 26. The cylinder assembly 10 can have a head end 27 and a rod end, shown by the arrow 29.

The piston member 18 may be a ring shaped element having a piston bore 30 formed longitudinally therein extending between a first end 31 and a second end 33 of the piston member 18. The second end 33 may be closer to the head end 27 of the cylinder assembly than the first end 31. The piston bore 30 may be substantially cylindrical in shape and may extend entirely through the piston member 18. One or more outer seal grooves 42 may be formed about the outer circumference of the piston member 18. A seal member (not shown), or wear band, may be seated within the grooves 42 for sealably engaging an inner surface 58 of a cylinder body 62 of the cylinder. The outer diameter of the piston member 18 may be slightly less than the inside diameter of the cylinder.

The piston member 18 may be threadably engaged with the rod member 22. Low torque can be utilized to threadably engage the piston member 18 with the rod member 22 as will be explained. In one example, a first outer segment 63 of the rod member 18 may be threaded to correspond with an inner threaded segment 65 of the wall defining the piston bore 30 to define a first threaded engagement 67. It can be appreciated that the interfacing portions of the rod member 22 and the piston bore 30 may have at least substantially the same dimensions, e.g., diameter, for effective coupling for the specific application.

A first inner seal groove 66 may be arranged within a wall segment of the wall defining the piston bore 30. A seal member 70, such as an O-ring, may be seated therein for sealably engaging an outer surface of the rod member 22. The seal member 70 can prevent pressurized fluid from passing in between the rod member 22 and the piston bore 30 in either the direction of a fluid chamber 74 of the cylinder assembly 10 or the direction into an opposing fluid chamber 88.

An outer shoulder 75 may be formed about the outer circumference of the rod member 22. For example, the outer shoulder 75 may be formed by a first transition from the first outer diameter of the rod member 22 to a second smaller diameter of the rod member 22. The first outer diameter region of the rod member can be a non-threaded region, whereas the second outer diameter region may correspond to the first outer segment 63 of the rod member which may be the threaded. The piston member 18 may include an inner seat 76 formed about the inner circumference of the piston bore 30 to engage the outer shoulder 75. For example, the inner seat 76 may be formed by a transition from the first outer diameter of the piston member 18 to a second smaller diameter of the piston member 18. The first outer diameter region of the piston member 18 can be a non-threaded region, whereas the second outer diameter region may correspond to the inner threaded segment 65 of the piston member. The outer shoulder 75 and the inner seat 76 can be each tapered for an improved conical interface.

In one example, the outer shoulder 75 and the inner seat 76 interface can be disposed closer to the first end 31 of the piston member 18 than to the second end 33 in order to reduce the likelihood of stress risers at the interface joint. In another example, the outer shoulder 75 and the inner seat 76 interface may be in a direction toward the rod end 29 such that such interface can bear axial loads from a direction from the head end 27, thereby reducing the amount of axial loading the threaded region between the rod and piston members have to withstand. Thus, for improved performance, such interface can be on the rod end (that is the right side) of the threaded region.

The relative position between the sealing region formed by the first inner seal groove 66 and the seal member 70 and the interface between the outer shoulder 75 and the inner seat 76 can be adjacent to one another. In one example, for improved assembly, such sealing region can be on the rod end (that is the right side) of the interface. This can permit the desired threaded engagement between the rod and piston members prior to compression of the seal member 70. The closer to the sealing region to the rod end relative to the interface, the more difficult assembly can be with a higher likely of a pinch or cut seal member 70.

A portion of the rod member 22, for example the first outer diameter segment, may be received within the piston bore 30. An end 82 of the rod member 22 can extend entirely beyond the second end 33 of the piston member 18. The rod member end 82 may be configured and arranged to couple to the retaining member 26.

The retaining member 26 may be a ring shaped element having a throughbore 83 formed longitudinally therein extending between a first end 85 and a second end 86 of the retaining member 26. The second end 86 can be closer to the head end 27 of the cylinder assembly than the first end 85. The throughbore 83 may be substantially cylindrical in shape and may extend entirely through the retaining member 26.

The retaining member 26 may be threadably engaged with the rod member 22. In one example, a second outer segment 89 of the rod member 18 corresponding to the rod member end 82 may be threaded to correspond with an inner threaded segment 90 of the throughbore 83 to define a second threaded engagement 87. It can be appreciated that the portion of the rod member 22 and the throughbore 30 may have at least substantially the same dimensions, e.g., diameter, for effective coupling for the specific application. The second outer segment 89 can be separated by a landing 89A that remains nonthreaded. The landing 89A may be recessed relative to the surrounding adjacent threaded portion of the second outer segment 89.

In one example, the retaining member 26 may be formed from a substantially rigid material, such as steel or the like, may have a tensile strength at least 1.3 times that of the maximum stresses likely to be encountered during operation of the piston and rod assembly 14. The outer surface of the retaining member 26 may be heat treated to attain the desired tensile strength.

Figure 3:
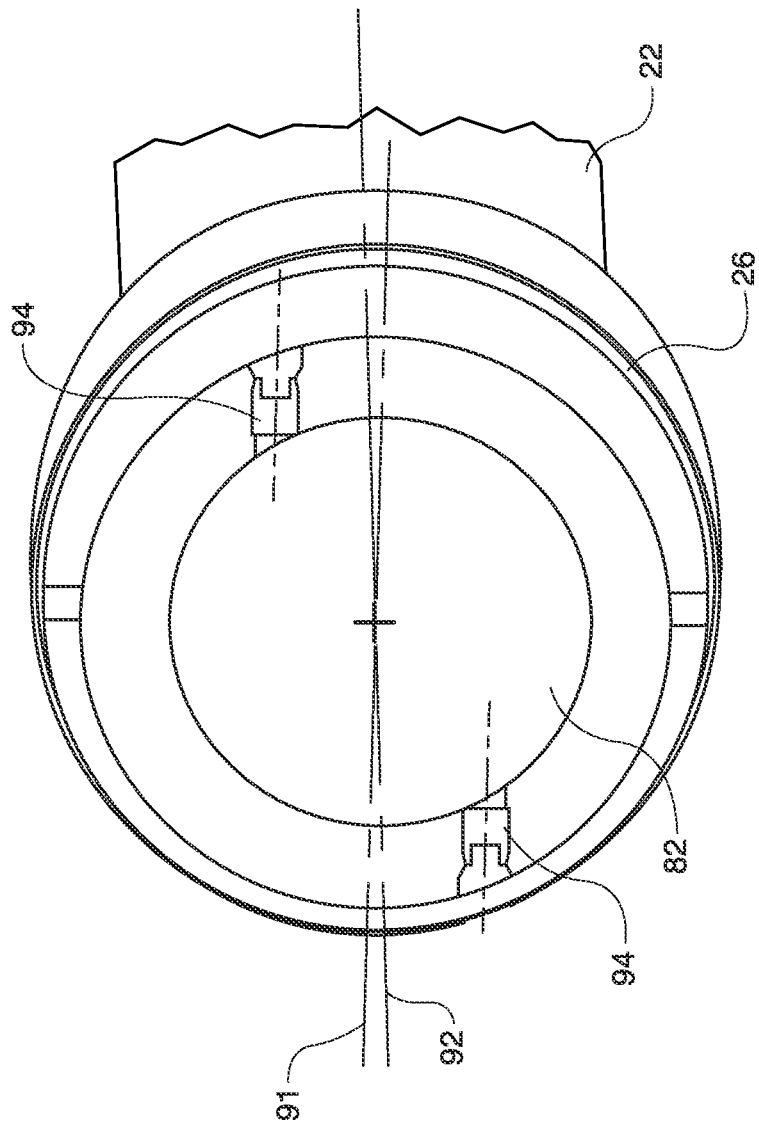
FIG. 3 is a transverse sectional view of the retaining member, depicting the setscrew bores.

FIG. 3 depicts a transverse sectional view of one example of the retaining member 26 coupled to the rod member end 82. Here, the retaining member 26 is shown disposed about a central axial axis 91. A transverse axis 92 extends through and transverse to the central axial axis 91 to define half sections of the retaining member 26. One or more setscrew bores 94 can be formed to extend from the outer circumference to the inner circumference of the retaining member 26 such that the setscrew bore may be in fluid communication with the throughbore 83 of the retaining member 26. The setscrew bore 94 may be internally threaded and capable of receiving a setscrew 96, such as shown in FIG. 2. When tightened, the setscrew tip can engage the outer circumference of the rod member end 82 to prevent loosening of the retaining member 26. In one example, the setscrew tip can engage the landing 89A. According to FIG. 3, when a pair of setscrew bores 94 may be formed, the bores can be along the transverse axis 92 or about an axis that may be substantially parallel to the transverse axis 92 or may be in an offset position. In one example, two setscrew bores (each for receiving a setscrew) can be each offset from the transverse axis 92, and preferably offset by substantially equal distances. Here, when tightened the pair of setscrews in an offset relationship from one another can help prevent loosening of the retaining member 26 from the rod member end 82. For enhanced engagement, i.e., to prevent backing out, a portion of the setscrew threading of the setscrew 96 can be formed with a wavy portion, such as sinuLOC™ threading. It can be appreciated by one of ordinary skill in the art that a single setscrew can be provided along the transverse axis or offset therefrom or any position along the retaining member, or that more than two setscrews can be provided along any position along the retaining member.

In one example, the threading pitch of the first threaded engagement 67 may be different than the threading pitch of the second threaded engagement 87. In another example, the threading pitch of the first threaded engagement 67 may be coarser than the threading pitch of the second threaded engagement 87.

The thread design of both of the first and second threaded engagements 67, 87 can be any conventional thread known in the art. The exterior of a thread design includes several distinguishing features. Namely, the thread design includes a flank or thread face, a crest or the top surfaces joining two flanks of a thread, a root or bottom surface joining the flanks of two adjacent flanks, and a pitch (P) which is the distance between two corresponding points of adjacent threads measured parallel to the axis, typically expressed in threads per inch. The minor diameter of the external thread can be the diameter of a virtual cylinder that touches the root of the external thread, whereas the major diameter of the internal thread can be the diameter of a virtual cylinder that touches the crest of the internal thread.

It has been found that a thread design with a root radius greater than about 0.125 P can improve fatigue life over conventional M class threads. Furthermore, the rod end having such thread design need not be processed in a manner for higher strength, such as constructed of higher strength materials and/or heat-treated which contribute to greater stress riser risks. In one example, the thread design can include a root radius in the range of about 0.15 P to about 0.18 P (0.18042 P to 0.15011 P) at the root of the external thread. A root radius greater than 0.18042 P may further improve fatigue life. To this end, the minor diameter of both external and internal threads can be increased to provide a basic thread height of 0.5625H in order to accommodate the external thread maximum root radius. The thread design can be aerospace metric threads (MJ) in accordance with ISO standard 5855. In one example, each thread design can be a MJ class thread.

INDUSTRIAL APPLICABILITY

The embodiments described herein may facilitate a relatively easy assembly process, while providing a robust coupling mechanism and method for a piston and rod assembly 14. Further, the embodiments described herein can improve the durability, manufacturability, and serviceability of the coupling mechanism.

During assembly, the rod member 22 may be threadably received within the piston bore 30 of the piston member 18 until the outer shoulder 75 engages the piston inner seat 76, which can form a conical interface. The rod member end 82 can extend outside the piston member 18. The torque applied to couple the piston member to the rod member can be any torque. In one example, low torque can be less than or equal to about 1000 Nm, in the range of about 400 to about 500 Nm, or preferably 450 Nm, to overcome issues involving high torque. Low torque coupling permits slight movement of the piston member relative to the rod member to take full advantage of substantially all of the threaded regions for better distributed forces along the treaded interface. The seal member may be in the groove prior to threadable engagement. A portion of the rod member may be threadably engaged with the tapped bore of the retaining member. One or more setscrews, such as the first setscrew and the second setscrew can be engaged through respective tapped setscrew bores formed in the retaining member. The setscrews can frictionally engage the rod end to prevent loosening of the piston member. The first and second setscrews can be positioned offset from the transverse axis for enhanced engagement.

One or more of the following features, alone or in any combination thereof, is believed to contribute to the longer life of the cylinder assembly 10, even under heavy machine loads and applications. The location of the interface between the outer shoulder of the rod member and the inner seat of the piston member can be closer to the rod end than the first threaded engagement between the piston and rod member. Such location can permit the interface, rather than the first threaded engagement, to withstand substantially all axial loading from the head end direction. However, the first threaded engagement can be configured to withstand substantially all axial loading from the rod end direction. For instance, the use of low torque (e.g., about 450 Nm) for initially coupling the piston member to the rod member permits the engagement between piston member and the rod member to relax (essentially zero torque) during operation of the cylinder assembly. Consequently, axial loads may be selectively distributed between the interface and the first threaded engagement as described herein. The location of the sealing region formed by the first inner seal groove of the piston member and the seal member can be closer to the rod end than the interface.

The retaining member may include a pair of setscrews, for example, sinuLOC™ setscrews, offset from one another for frictional engagement with the rod end order to reduce the likelihood of relative rotation between the retaining member and the rod member. The thread pitch of the first threaded engagement may be coarser than the second threaded engagement to prevent loosening of the piston member from the rod member. The first threaded engagement, the second threaded engagement, or both can be a thread design including a root radius in the range of, e.g., about 0.18042 P to about 0.15011 P at the root of the external thread or alternatively threaded with a MJ class thread. In one example, the piston and rod assembly may include each and every feature.

For example, the combination of features can increase the fatigue life for heavy-duty application, such as high pressure, high duty cycle, and/or high life cycle applications. In an exemplary application of the described apparatus, the cylinder assembly 10 may be used on an earthmoving machine, such as a dozer. For example, the assembly 10 may be configured and arranged on the dozer so that high pressure within a head end chamber of the cylinder causes movement of the piston and rod assembly 10 to position or otherwise move the blade of the dozer. As may be appreciated according to the explanation provided hereinabove, actuating pressures supportable by the assembly 10 (to move the blade of the dozer) may be greater than those supportable by similarly-sized prior art cylinders, which may have reduced-diameter threaded rod ends engaging correspondingly reduced-diameter portions of a piston member. Further, manufacturing costs can be reduced because the rod member can experience little to no heat treatment that is typically associated with the rod members, which heat treatment often contributed greater stress riser risks and reduced fatigue life.

It will be apparent to those skilled in the art that various modifications and variations can be made in the disclosed fluid control system without departing from the scope or spirit of the present disclosure. Other embodiments of the present disclosure will be apparent to those skilled in the art from consideration of the specification and practice of the description herein. It is intended that the specification and examples be considered as exemplary only, with a true scope and spirit of the invention being indicated by the following claims and their equivalents.

What is claimed is:

1. A piston and rod assembly for use with an actuating device, comprising:
    a piston member having a piston bore extending between a first end and a second end, the piston bore having a threaded segment;
    a rod member having a first threaded region threadably engaged with the threaded segment of the piston bore, an end region extending beyond the second end of the piston member, and a second threaded region at the end region; and
    a retaining member having a retaining bore extending therein, the retaining bore having a threaded portion threadably engaged with the second threaded region,
    wherein an external thread of each of the threaded segment and the first threaded region has a pitch and is formed with a root radius of greater than 0.125 pitch.

2. The assembly of claim 1, wherein the piston member is coupled to the rod member at a torque of less than or equal to about 1000 Nm.

3. The assembly of claim 2, wherein the retaining member comprises a setscrew bore and a setscrew threadably engaged therein.

4. The assembly of claim 2, wherein the retaining member comprises a pair of setscrew bores and a setscrew threadably engaged therein, offset from one another relative to a transverse axis.

5. The assembly of claim 4, wherein each setscrew includes a wavy thread.

6. The assembly of claim 4, wherein the piston bore comprises an inner seat and the rod member comprises an outer shoulder, wherein the inner seat and the outer shoulder engage one another and form an interface.

7. The assembly of claim 6, wherein the piston bore comprises an inner seal groove disposed adjacent the inner seat, the inner seal groove having a seal member.

8. The assembly of claim 7, wherein the conical interface and the inner seal groove are disposed closer to the first end of the piston member than the threaded segment.

9. The assembly of claim 7, wherein the inner seal groove is disposed closer to the first end of the piston member than the conical interface.

10. The assembly of claim 4, wherein the threaded segment and the first threaded region have a first thread pitch, the threaded region and the second threaded region have a second thread pitch different than the first thread pitch.

11. The assembly of claim 10, wherein the second thread pitch is finer than the first thread pitch.

12. A piston and rod assembly for use with an actuating device, comprising:
    a piston member having a piston bore extending between a first end and a second end, the piston bore having a threaded segment;
    a rod member having a first threaded region threadably engaged with the threaded segment, an end region extending beyond the second end of the piston member, where the end region comprises a second threaded region; and
    a retaining member having a retaining bore extending therein, the retaining bore having a threaded portion threadably engaged with the second threaded region,
    wherein an external thread of each of the threaded segment and the first threaded region has a pitch and is formed with a root radius in the range of about 0.15 pitch to about 0.18 pitch, wherein the piston bore comprises an inner seat and the rod member comprises an outer shoulder, the inner seat and the outer shoulder engage one another to form an interface, the piston bore comprises an inner seal groove disposed adjacent the inner seat to include a seal member, the interface and the inner seal groove disposed closer to the first end of the piston member than the threaded segment.

13. The piston and rod assembly of claim 12, wherein the inner seal groove is disposed closer to the first end of the piston member than the interface.

14. The assembly of claim 13, wherein the retaining member comprises a pair of setscrew bores and corresponding setscrews threadably engaged therein, offset from one another relative to a transverse axis, wherein tips of the setscrews engage a recessed landing formed in the rod member end region.

15. The assembly of claim 14, wherein each setscrew includes a wavy thread.

16. The assembly of claim 15, wherein the threaded segment and the first threaded region have a first thread pitch, the threaded region and the second threaded region have a second thread pitch finer than the first thread pitch, wherein the piston member is coupled to the rod member at a torque of less than or equal to about 1000 Nm.

17. A method of coupling a piston member having a piston bore with a rod member, comprising:

threadably engaging a first portion of the rod member with the piston bore at a torque until an inner seat of the piston bore and an outer shoulder of the rod member engage with one another, wherein an external thread of each of a threaded segment of the piston bore and a first threaded region of the first portion of the rod member has a pitch and is formed with a root radius of greater than 0.125 pitch;

threadably engaging a second portion of the rod member into a retaining bore of a retaining member; and threadably engaging at least one setscrew through a corresponding setscrew bore formed in the retaining member so that a tip of the setscrew engages the rod member.

18. The method of claim 17, wherein the torque is equal to or less than 1000 Nm, and wherein the pitch of the threaded segment and the first threaded region is greater than a pitch of the corresponding threaded portions of the second portion of the rod member and the retaining bore.

19. The method of claim 18, wherein threadably engaging at least one setscrew step further comprises threadably engaging a first setscrew and a second setscrew through corresponding setscrew bores formed in the retaining member, wherein the first and second setscrews are offset from a transverse axis, and each setscrew includes a wavy thread.

20. The method of claim 19, wherein the bore of the piston member comprises an inner seal groove disposed adjacent the inner seat, the inner seal groove containing a seal member, the inner seal groove is disposed closer to the first end of the piston member than the conical interface.

* * * * *